US008832658B2

(12) United States Patent
Jentsch et al.

(10) Patent No.: US 8,832,658 B2
(45) Date of Patent: Sep. 9, 2014

(54) VERIFICATION FRAMEWORK FOR BUSINESS OBJECTS

(75) Inventors: Frank Jentsch, Muehlhausen (DE); Frank Brunswig, Heidelberg (DE); Bare Said, St. Leon-Rot (DE)

(73) Assignee: SAP AG, Walldorf (DE)

(*) Notice: Subject to any disclaimer, the term of this patent is extended or adjusted under 35 U.S.C. 154(b) by 866 days.

(21) Appl. No.: 12/975,096

(22) Filed: Dec. 21, 2010

(65) Prior Publication Data

US 2012/0159446 A1 Jun. 21, 2012

(51) Int. Cl.
*G06F 9/44* (2006.01)

(52) U.S. Cl.
CPC .......................................... *G06F 9/44* (2013.01)
USPC ............................................................ 717/124

(58) Field of Classification Search
None
See application file for complete search history.

(56) References Cited

U.S. PATENT DOCUMENTS

| 6,513,154 B1 * | 1/2003 | Porterfield .................... 717/101 |
| 7,225,432 B2 | 5/2007 | Jentsch et al. |
| 7,225,433 B2 | 5/2007 | Jentsch et al. |
| 7,315,853 B2 | 1/2008 | Brunswig et al. |
| 7,454,660 B1 | 11/2008 | Kolb et al. |
| 7,480,920 B2 | 1/2009 | Brendle et al. |
| 7,487,512 B2 | 2/2009 | Brunswig et al. |
| 7,533,103 B2 | 5/2009 | Brendle et al. |
| 7,536,673 B2 | 5/2009 | Brendle et al. |
| 7,676,816 B2 | 3/2010 | Brunswig et al. |
| 7,685,114 B2 | 3/2010 | Brunswig et al. |
| 7,685,268 B2 | 3/2010 | Brunswig et al. |
| 7,685,568 B2 | 3/2010 | Brendle et al. |
| 7,698,174 B2 | 4/2010 | Brunswig et al. |
| 7,702,650 B2 | 4/2010 | Brunswig et al. |
| 7,725,907 B2 | 5/2010 | Bloching et al. |
| 7,730,412 B2 | 6/2010 | Said |
| 7,765,494 B2 | 7/2010 | Brunswig et al. |
| 7,769,821 B2 | 8/2010 | Brunswig et al. |
| 7,770,146 B2 | 8/2010 | Brunswig et al. |
| 7,774,463 B2 | 8/2010 | Bloching et al. |
| 7,778,965 B2 | 8/2010 | Bindewald et al. |
| 7,797,370 B2 | 9/2010 | Brunswig et al. |
| 7,801,996 B2 | 9/2010 | Brunswig et al. |
| 7,810,102 B2 | 10/2010 | Brendle et al. |
| 8,510,712 B1 * | 8/2013 | Killmar, III ................... 717/124 |
| 2004/0199818 A1 * | 10/2004 | Boilen et al. ..................... 714/25 |
| 2005/0021557 A1 * | 1/2005 | Brendle et al. ............ 707/103 R |
| 2006/0004699 A1 * | 1/2006 | Lehikoinen et al. ............ 707/2 |
| 2006/0101403 A1 * | 5/2006 | Sharma et al. ................ 717/124 |
| 2007/0006041 A1 | 1/2007 | Brunswig et al. |
| 2007/0061431 A1 | 3/2007 | Brunswig et al. |
| 2007/0073702 A1 | 3/2007 | Brunswig et al. |
| 2007/0100943 A1 | 5/2007 | Brunswig et al. |
| 2007/0124740 A1 | 5/2007 | Brunswig et al. |
| 2007/0157167 A1 | 7/2007 | Brendle et al. |
| 2007/0226751 A1 | 9/2007 | Brendle et al. |

(Continued)

*Primary Examiner* — Jue Louie

(74) *Attorney, Agent, or Firm* — Fish & Richardson P.C.

(57) ABSTRACT

The present disclosure involves systems, products, and methods for automatically testing and verifying business objects. One method includes operations for identifying a modified business object for testing and verification; retrieving a set of metadata associated with the identified modified business object, the set of metadata retrieved from a metadata repository and including at least one core service performed by the identified modified business object; identifying at least one verification procedure associated with at least one of the core services operable to be performed by the identified modified business object; executing each of the at least one identified verification procedures; and determining whether execution of at least one of the identified verification procedures failed.

16 Claims, 4 Drawing Sheets

(56) References Cited

U.S. PATENT DOCUMENTS

| | | |
|---|---|---|
| 2007/0233728 A1 | 10/2007 | Puteick et al. |
| 2007/0271107 A1 | 11/2007 | Fiedler et al. |
| 2008/0005623 A1 | 1/2008 | Said |
| 2008/0010074 A1 | 1/2008 | Brunswig et al. |
| 2008/0120597 A1 | 5/2008 | Brunswig et al. |
| 2008/0120602 A1* | 5/2008 | Comstock et al. ............ 717/125 |
| 2008/0147455 A1 | 6/2008 | Brunswig et al. |
| 2008/0148166 A1 | 6/2008 | Brunswig et al. |
| 2008/0244616 A1 | 10/2008 | Brunswig et al. |
| 2008/0276225 A1* | 11/2008 | Saterdag et al. .............. 717/127 |
| 2009/0019424 A1 | 1/2009 | Klein |
| 2009/0144721 A1 | 6/2009 | Wagner et al. |
| 2009/0150473 A1 | 6/2009 | Brunswig et al. |
| 2009/0313606 A1* | 12/2009 | Geppert et al. ............... 717/124 |
| 2010/0095276 A1* | 4/2010 | Ottavi et al. .................. 717/125 |

\* cited by examiner

VERIFICATION FRAMEWORK FOR BUSINESS OBJECTS

TECHNICAL FIELD

The present disclosure relates to software, computer systems, and computer implemented methods for testing modified business objects.

BACKGROUND

Software developers and business users frequently adapt business applications by creating or modifying code and objects to be used within or with those business applications. Business applications can be described by metadata, and can be implemented through the use of one or more business objects. A business object is a meta-object defining the relevant data structure of a particular business object, such as a Sales Order business object. The Sales Order business object can include multiple business object nodes such as Item and other business object nodes corresponding to the features of a real-world Sales Order, along with elements defining data associated with each business object node. Furthermore, a business object can further define sets of behavioral aspects, including supported actions and core services performed by the business object (e.g., Release), associations of the business object (e.g., related products), and queries associated with or performed by the business object (e.g., searches for a specific Sales Order Item). Business applications can provide a runtime environment to process business object instances based on the business object's information, actions, and core services.

Each business object is created and implemented through the definition of a plurality of rules and guidelines specified in a set of enterprise services specifications. Testing new and modified business objects is generally performed manually, requiring extensive manual testing to ensure the new or modified business object conforms to the various requirements of its associated enterprise services specification. Further, in order to automate testing of a new or modified business object, a set of business object-specific tests, specifications, and requirements must be defined.

SUMMARY

The present disclosure involves systems, products, and methods for automatically testing and verifying business objects. One method includes operations for identifying a modified business object for testing and verification; retrieving a set of metadata associated with the identified modified business object, the set of metadata retrieved from a metadata repository and including at least one core service performed by the identified modified business object; identifying at least one verification procedure associated with at least one of the core services operable to be performed by the identified modified business object; executing each of the at least one identified verification procedures; and determining whether execution of at least one of the identified verification procedures failed.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
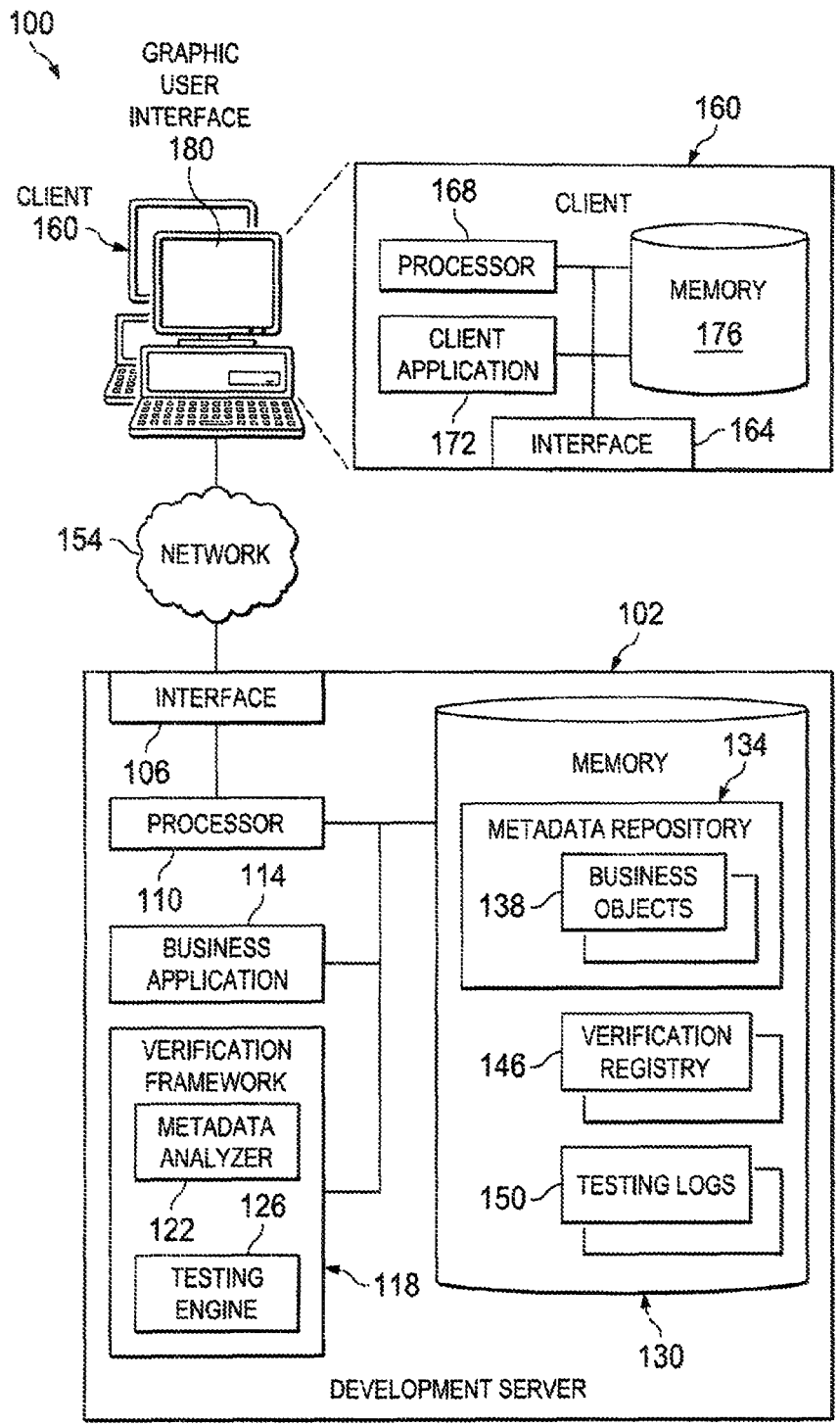
FIG. 1 illustrates an example environment for automatically testing and verifying modified business objects.

This disclosure generally describes software, computer-implemented methods, and systems relating to automatically testing, verifying, and validating business objects and other software components in a development environment. A testing and verification environment is provided to ensure that newly generating and/or modified business objects within an enterprise system satisfy one or more specifications and requirements prior to their deployment in a production system. Each business object implementation is required to follow a specific set of rules and guidelines based on an underlying business object type and its defined operations. The present disclosure describes a system that can analyze the type of business object that has been modified based on a set of generic verification checks associated with each business object of a specified type. Since the verification checks are generic, the checks can be performed without requiring business object specific testing. Therefore, the present disclosure provides a framework for identifying the business object type and the portion thereof that is generic, identifies the checks associated with the generic portion of that business object type, and uses a testing engine to execute and analyze the generic portion and functionality of the new or modified business object prior to its deployment.

By performing these checks prior to deployment, and in some instances, immediately upon the creation or modification of the business object, errors and other issues associated with the business objects can be identified and corrected. As costs for modifying software increase exponentially as the software continues through the development, testing, and production environments, the earlier issues can be identified, the less cost and time to correct them. Still further, the described framework also shortens the amount of time to place a newly created or modified business object into production by reducing the amount of manual testing and verification required. By automatically performing a set of generic tests associated with the business object, the amount of checks, verifications, and testing that is to be performed manually is greatly reduced. For example, anywhere from 10-20% of the overall testing requirements for a particular business object may be automated, reducing both the amount of testing and verification time required during the testing phase of software development, but also the possibility of human or user error during the testing process. Further, any additional modifications to the business object would generally require another round or set of manual tests, thereby again delaying the deployment of the business object and increasing the possibility of human error.

The framework and system described in the present application is described primarily through the use of three components: (1) a check, or verification, registry defining the relevant rules and guidelines to be verified for different business objects; (2) a metadata analyzer for determining the type of a particular business object and deriving its core services and components; and (3) a testing engine for providing a runtime environment for executing at least a portion of the functionality associated with the business object in order to analyze the results of the execution in light of the rules and guidelines included within the check registry. The framework may be consolidated onto a single development and testing server, or distributed within multiple servers and systems, including in a cloud-based, or on-demand system accessible via one or more web-based service calls. Additional, different, and/or fewer components may be used in alternative implementations.

Turning to the illustrated example, FIG. 1 illustrates an example environment 100 for automatically testing, verifying, and validating business objects. The illustrated environment includes, or is communicably coupled with, a development server 102 and at least one client 160, at least some of which communicate across a network 154. In general, environment 100 depicts an example configuration of a system capable of identifying a new or modified business object within a metadata repository 134, determining at least one generic portion of the business object, such as a service or action associated with or performed by the business object, and testing each of the at least one generic portions of the business object according to one or more requirements or verification standards defined within the system.

In general, the development server 102 is any server that stores one or more business applications 114, where at least a portion of the business applications 114 are executed via requests received from and responses sent to users or clients (e.g., client 160) within and/or communicably coupled to the illustrated environment 100 of FIG. 1. In some instances, requests and responses may also be received and/or sent between one or more clients, users, or entities not illustrated in FIG. 1. In general, the development server 102 may be a part of a larger development environment, and may in fact be represented as more than one server or system, with each portion performing a portion of the functionality described herein. In some instances, the development server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the development server 102 may store a plurality of business applications 114, while in other instances, the development server 102 may be a dedicated server meant to store and execute only a single business application 114. In some instances, the development server 102 may comprise a web server or be communicably coupled with a web server, where the business applications 114 represent, at least in part, one or more web-based applications accessed and executed via network 154 by the clients 160 of the system to perform the programmed tasks or operations of the business application 114. Additionally, the development server 102 may perform the operations associated with a verification framework 118 used to automatically test and verify the operations and definitions of a new or modified business object associated with the business application 114. The verification framework 118 is disclosed in additional detail below.

At a high level, the development server 102 comprises an electronic computing device operable to receive, transmit, process, store, or manage data and information associated with the environment 100. The development server 102 illustrated in FIG. 1 can be responsible for receiving application requests from one or more client applications 172 or business applications associated with the clients 160 of environment 100, responding to the received requests by processing said requests in the associated business application 114 (and further processed by the verification framework 118), and sending the appropriate response from the business application 114 or verification framework 118 back to the requesting client application 172. Alternatively, the business application 114 and/or the verification framework 118 at development server 102 can be capable of processing and responding to local requests from a user accessing the development server 102 locally. Accordingly, in addition to requests from the clients 160 illustrated in FIG. 1, requests associated with the business application 114 and/or the verification framework 118 may also be sent from internal users, external or third-party customers, and other automated applications, as well as any other appropriate entities, individuals, systems, or computers. Further, the terms "client application" and "business application" may be used interchangeably as appropriate without departing from the scope of this disclosure.

As used in the present disclosure, the term "computer" is intended to encompass any suitable processing device. For example, although FIG. 1 illustrates the development server 102 as a single server, environment 100 can be implemented using two or more servers for the development server 102, as well as computers other than servers, including a server pool. Indeed, development server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated development server 102 may be adapted to execute any operating system, including Linux, UNIX, Windows, Mac OS, or any other suitable operating system. According to one embodiment, the development server 102 may also include or be communicably coupled with a mail server.

In the present implementation, and as shown in FIG. 1, the development server 102 includes an interface 106, a processor 110, a memory 130, one or more business applications 114, and a verification framework 118. The interface 106 is used by the development server 102 for communicating with other systems in a client-server or other distributed environment (including within environment 100) connected to the network 154 (e.g., client 160, as well as other systems communicably coupled to the network 154 not shown herein). Generally, the interface 106 comprises logic encoded in software and/or hardware in a suitable combination and operable to communicate with the network 154. More specifically, the interface 106 may comprise software supporting one or more communication protocols associated with communications such that the network 154 or interface's hardware is operable to communicate physical signals within and outside the illustrated environment 100.

Although not illustrated in FIG. 1, the development server 102 may also include a local user interface, such as a graphical user interface (GUI). The local GUI can comprise a graphical user interface operable to, for example, allow a local user of the development server 102 to interface with at least a portion of the platform for any suitable purpose, such as creating, preparing, requesting, or analyzing data associated with the execution of a particular business application 114 or information associated with a particular new or modified business object and its verification process. Generally, the local GUI provides the particular user with an efficient and user-friendly presentation of business data provided by or communicated within the system. The local GUI may comprise a plurality of customizable frames or views having interactive fields, pull-down lists, and buttons operated by the user. For example, the local GUI may provide interactive elements that allow a user to enter, select, create, or modify elements of business process instances or business object instances in the local GUI. More generally, the local GUI may also provide general interactive elements that allow a user to access and utilize various services and functions of business application 114 and/or the verification framework 118, including any modifications that may be made to new or modified implementations of business objects and other information associated with the business application 114. The local GUI is often configurable, supports a combination of tables and graphs (bar, line, pie, status dials, etc.), and is able to build real-time portals, where tabs are delineated by key characteristics (e.g., site or micro-site). Therefore, the local GUI contemplates any suitable graphical user interface, such as a combination of a generic web browser, intelligent engine, and command line interface (CLI) that processes information in the platform and efficiently presents the results to the user visually.

Example development server 102 is communicably coupled with a network 154 that facilitates wireless or wireline communications between the components of the environment 100 (i.e., between the development server 102 and one or more of clients 160), as well as with any other local or remote computer, such as additional clients, servers, or other devices communicably coupled to network 154 but not illustrated in FIG. 1. In the illustrated environment, the network 154 is depicted as a single network, but may be a continuous or discontinuous network without departing from the scope of this disclosure, so long as at least a portion of the network 154 may facilitate communications between senders and recipients. The network 154 may be all or a portion of an enterprise or secured network, while in another instance, at least a portion of the network 154 may represent a connection to the Internet. In some instances, a portion of the network 154 may be a virtual private network (VPN), such as, for example, the connection between at least one of the clients 160 and the development server 102. Further, all or a portion of the network 154 can comprise either a wireline or wireless link. Example wireless links may include 802.11a/b/g/n, 802.20, WiMax, and/or any other appropriate wireless link. In other words, the network 154 encompasses any internal or external network, networks, sub-network, or combination thereof operable to facilitate communications between various computing components inside and outside the illustrated environment 100. The network 154 may communicate, for example, Internet Protocol (IP) packets, Frame Relay frames, Asynchronous Transfer Mode (ATM) cells, voice, video, data, and other suitable information between network addresses. The network 154 may also include one or more local area networks (LANs), radio access networks (RANs), metropolitan area networks (MANs), wide area networks (WANs), all or a portion of the Internet, and/or any other communication system or systems at one or more locations. The network 154, however, is not a required component of the present disclosure, such that some or all of the functionality may be performed locally at the development server 102.

As illustrated in FIG. 1, the development server 102 includes a processor 110. Although illustrated as a single processor 110 in FIG. 1, two or more processors may be used according to particular needs, desires, or particular embodiments of environment 100. Each processor 110 may be a central processing unit (CPU), a blade, an application specific integrated circuit (ASIC), a field-programmable gate array (FPGA), or another suitable component. Generally, the processor 110 executes instructions and manipulates data to perform the operations of the development server 102 and, specifically, the one or more business applications 114 and the verification framework 118 included on or within the development server 102. Specifically, the development server's processor 110 executes the functionality required to receive and respond to requests from the clients 160 and their respective client applications 172, as well as the functionality required to perform the other operations of the business application 114 and the verification framework 118.

Regardless of the particular implementation, "software" may include computer-readable instructions, firmware, wired or programmed hardware, or any combination thereof on a tangible and/or non-transitory medium operable, when executed, to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, processor 110 executes one or more business applications 114 and the verification framework 118 on the development server 102.

At a high level, each of the one or more business applications 114 is any application, program, module, process, or other software that may execute, change, delete, generate, or otherwise manage information according to the present disclosure, particularly in response to and in connection with one or more requests received from the illustrated clients 160 and their associated client applications 172. In certain cases, only one business application 114 may be located at a particular development server 102. In others, a plurality of related and/or unrelated business applications 114 may be stored at the development server 102, or located across a plurality of other servers comprising the development server 102, as well. In certain cases, environment 100 may implement a composite business application 114. For example, portions of the composite application may be implemented as Enterprise Java Beans (EJBs) or design-time components, and may have the ability to generate run-time implementations into different platforms, such as J2EE (Java 2 Platform, Enterprise Edition), ABAP (Advanced Business Application Programming) objects, or Microsoft's .NET, among others. Additionally, the business application 114 may represent web-based applications accessed and executed by remote clients 160 or client applications 172 via the network 154 (e.g., through the Internet). Further, while illustrated as internal to the development server 102, one or more processes associated with a particular business application 114 may be stored, referenced, or executed remotely. For example, a portion of a particular business application 114 may be a web service associated with the application that is remotely called, while another portion of the business application 114 may be an interface object or agent bundled for processing at a remote client 160

(such as client application 172). Moreover, any or all of the business applications 114 may be a child, sub-module, or portion of another software module or enterprise application (not illustrated) without departing from the scope of this disclosure. Still further, portions of the business application 114 may be executed by a user or operator working directly, or locally, at the development server 102, as well as remotely at client 160.

As illustrated and as described above, the processor 110 can also execute the verification module 118 that can be used in, associated with, or embedded within, one or more of the business applications 114. In some implementations, the verification framework 118 can be executed by a different processor or server external to the development server 102, such as by a server or other system communicably coupled to the development server 102 through network 154. For example, the verification framework 118 may be provided as an on-demand service via a cloud computing network or platform, such as a web service accessible via network 154, or as a service provided on a dedicated server or computer other than the development server 102.

In general, the verification framework 118 can be used to automatically perform at least a portion of the testing and verification of newly created or modified business objects (such as a business object 138 included in a metadata repository 134). Generally, the verification framework 118 can receive, identify, obtain, or be provided with information on newly created or modified business objects associated with at least one business application 114, such as those business objects created, adapted, or modified within a development environment. Once the verification framework 118 identifies or receives information on a modified business object, the verification framework 118 can use its components to determine the type of business object identified, cross-reference a set of metadata defining the business object, determine at least one testing or verification check to be performed, execute the at least one testing or verification check, and evaluate the results of the at least one testing or verification check to determine if the business object can be at least partially verified.

The functionality of the verification framework 118 can be performed by various modules and components, such as the metadata analyzer 122 and the testing engine 126, as illustrated in FIG. 1. The metadata analyzer 122 is a component of the verification framework 118 that can be used to determine the structure of an identified business object, including one or more core services performed by the business object. In the illustrated example, the metadata analyzer 122 can access a metadata repository 134 stored in memory 130, where the metadata repository 134 stores a set of business objects 138, as well as related metadata describing different business object types and other business object-related information.

In some instances, the set of business objects 138 may include one or more business objects associated with a particular business application 114, including one or more business objects that have been recently created or modified. The metadata analyzer 122 can identify, either automatically after the creation or modification has occurred, or manually after identification or selection by a user, a particular business object upon which to perform the verification operations. Once the business object is identified, the metadata analyzer 122 can access the contents of the identified business object to determine the business object's type, the core services performed by the business object, as well as other metadata, including a metamodel defining the organization and structure of the business object. Each business object may also include one or more business object nodes, with each node defining additional metadata for the business object and providing relations to one or more database tables including information and data used to customize different instances of particular business objects.

Figure 2:
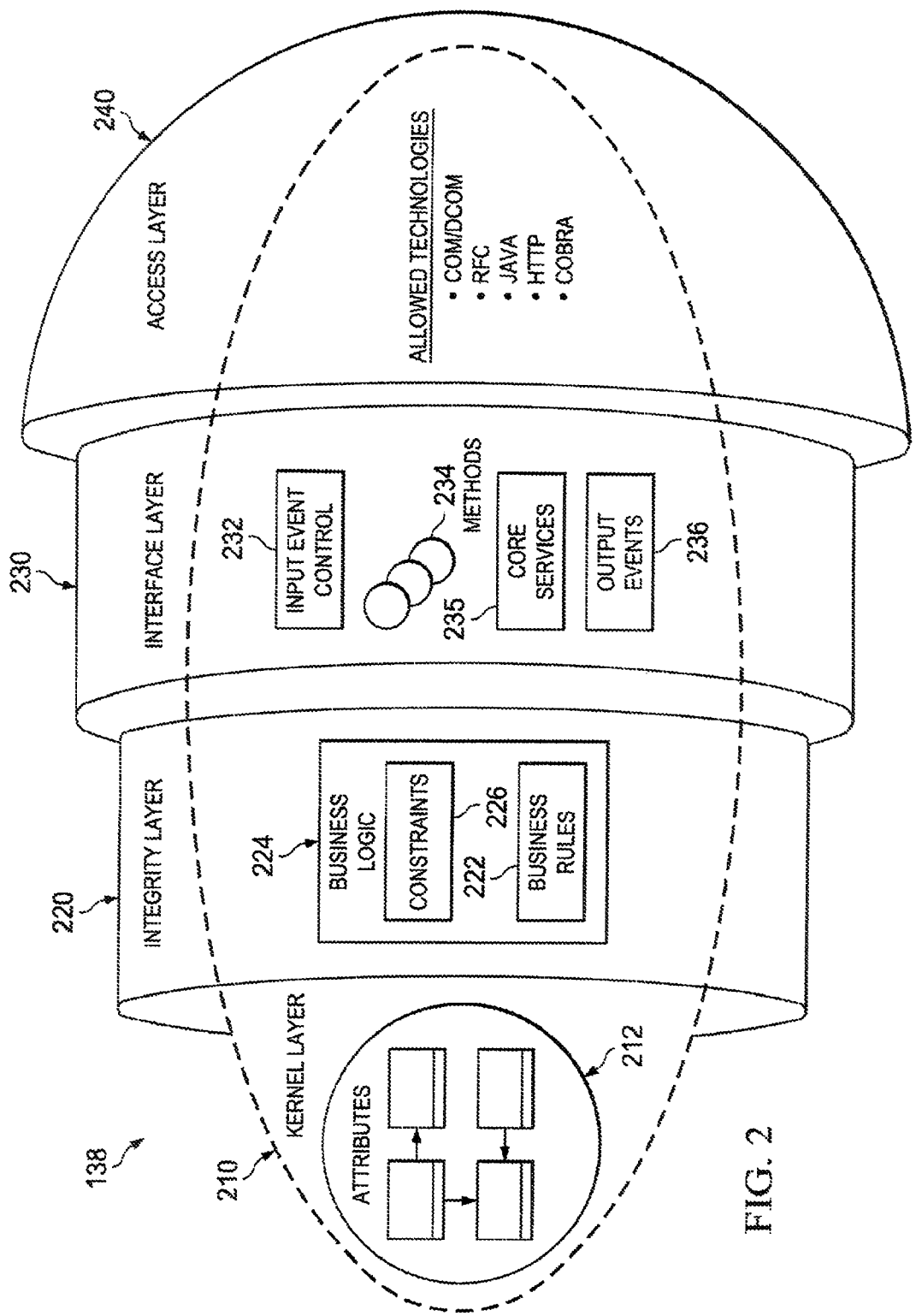
FIG. 2 is a schematic representation of one business object architecture for use by an appropriate system, such as the system described in FIG. 1.

FIG. 2 illustrates the structure of a generic business object 138 in environment 100. In general, the overall structure of the business object model can ensure the consistency of the interfaces that are derived from the business object model. The derivation helps ensure that the same business-related subject matter or concept can be represented and structured in the same way in various interfaces. The business object model can define the business-related concepts at a central location for a number of business transactions. In other words, it reflects the decisions made about modeling the business entities of the real world acting in business transactions across industries and business areas. The business object model can be defined by the business objects and their relationship to each other (the overall net structure).

Each business object is thus a capsule with an internal hierarchical structure, behavior offered by its operations, and integrity constraints. Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure. In some instances, a plurality of packaged or grouped business objects can be visualized by the visualizer system 108 as a group, to discover business objects, within the grouping, that satisfy or best correspond to certain criteria.

A business object may be defined such that it contains multiple layers, such as in the example business object 138 of FIG. 2. The example business object 138 contains four layers: the kernel layer 210, the integrity layer 220, the interface layer 230, and the access layer 240. The innermost layer of the example business object is the kernel layer 210. The kernel layer 210 represents the business object's 138 inherent data, containing various attributes 212 of the defined business object. Attributes of a business object can be used to map the business object to certain criteria for use in visualizing the business object.

The second layer represents the integrity layer 220. In the example business object 138, the integrity layer 220 contains the business logic 224 of the object. Such logic may include business rules 222 for consistent embedding in the environment 100 and the constraints 226 regarding the values and domains that apply to the business object 138. Business logic 224 may comprise statements that define or constrain some aspect of the business, such that they are intended to assert business structure or to control or influence the behavior of the business entity. It may pertain to the facts recorded on data and constraints on changes to that data. In effect, business logic 224 may determine what data may, or may not, be recorded in business object 138.

The third layer, the interface layer 230, may supply the valid options for accessing the business object 138 and describe the implementation, structure, and interface of the business object to the outside world. To do so, the interface layer 230 may contain methods 234, core services 235, input event controls 232, and output events 236. The methods 234 and core services 235 can describe different actions that the business object 138 is capable of performing. In some instances, the core services 235 defined in the business object 138 may be considered generic, in that similar core services may be included in and performed by different business objects within the set of business objects 138 (illustrated in FIG. 1), using similar functionality and capabilities. These core services 235 may then be tested in a generic manner in order to allow varying types of new and modified business objects to be generically tested prior to their completion and deployment. Example core services may include QUERY, RETRIEVE, and MODIFY operations. Core services generally follow a predefined technical interface or other set of instructions to perform their operations. An expected behavior (or set of behaviors) associated with a particular core service may be defined or described in a textual specification. In some instances, the textual specification can be analyzed and understood by a computer program or process, such that the actual results of a core service's execution can be compared against the expected results. Generally, the expected behavior contains generic parts which are independent of a specific set of business logic or information. The verification framework described herein can check or test the generic part of the core services to determine if they are operating correctly for a particular new or modified business object.

The fourth and outermost layer of the business object 138 in FIG. 2 is the access layer 240. The access layer 240 defines the technologies that may be used for external access to the business object's 138 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 138 of this embodiment may implement standard object-oriented technologies such as encapsulation, inheritance, and/or polymorphism.

Returning to FIG. 1, the metadata analyzer 122 can identify one or more core services 235 included within a particular business object 138. The metadata analyzer 122, or another portion of the verification framework 118, can then reference a verification registry 146 to determine one or more checks or verification procedures associated with at least some of the core services 235 that can be generically tested using defined procedures and expected outcomes. The verification registry 146 can be any type of file or database storing information associating one or more core services with one or more verification procedures, checks, and/or tests. The verification registry 146 can be accessed by the verification framework 118 or the metadata analyzer 122 to match or associate the core services located within an identified business object to the verification or testing procedures listed or described therein. In some instances, fewer than all of the core services included within a particular business object may be associated with generic verifications or checks within the verification registry 146. In those instances, the generic testing operations may only be performed on a portion of those core services associated with testing and verification procedures.

Once the correct verification, testing, and/or checks associated with a particular core service are determined (as described above by the metadata analyzer 122), the verification framework 118 can use its testing engine 126 to execute each (or a portion) of the core services associated with particular verification or testing procedures, and compare the results of the execution with one or more expected results (e.g., specific error messages, value calculations, or other performance-related indicia) associated with the executed procedure and core service. One example of a verification for a particular core service may be associated with locking or otherwise protecting information in a particular business object. For instance, one business object may include or be associated with data that should be locked to external modifications when a current instance is running. In that example, the testing engine 126 can open a first instance of the business object to cause the exclusive data lock to engage, while then attempting to open a second instance of the business object. The expected result of the second instance should be a rejection of any modification—or in some instances, access—to the data of the business object due to the executing first instance of the business object. If the modification is allowed, the testing engine 126 can determine that the core service failed in its verification, while if the modification is rejected, the testing engine 126 can determine that the core service was successfully verified for the locking check. Some core services may be associated with multiple verification procedures and tests, while other core services may be associated with a single test. The testing engine 126 may be adapted to perform the verification checks and procedures sequentially or concurrently, as well as in any particular order. In some instances, the order of the testing engine's 126 performance of various checks may be dynamically determined by the testing engine 126 based on priority, average time to complete a check, or available processing power, as well as other suitable criteria.

The results of each verification procedure can be stored within one or more testing logs 150, also stored in memory 130. The testing logs 150 can be any suitable file, including text files, databases, XML files, comma-delimited text files, or spreadsheets, among others. Additionally, one or more users or administrators associated with the development system 102 can be notified by the verification framework 118 if errors or other issues arise. The testing logs 150 can be provided to a software developer responsible for the creation, design, and/or modification of a particular business object after the verification framework 118 completes its operations.

As illustrated, the metadata repository 134 (and its set of business objects 138), the verification registry 146, and the one or more testing logs 150 are illustrated within memory 130 of FIG. 1. Memory 130 can store data and program instructions, including the business objects and other information and data associated with the development server 102, a specific instance of the business application 114, or the verification framework 118 itself. Memory 130 may include any memory or database module and may take the form of volatile or non-volatile memory including, without limitation, magnetic media, optical media, random access memory (RAM), read-only memory (ROM), removable media, or any other suitable local or remote memory component. Memory 130 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the development server 102, its business applications 114, and the verification framework 118. Still further, while memory 130 is illustrated entirely within the development server 102 in FIG. 1, some or all of the components illustrated in memory 130 may be stored external to the development server 102 and/or to the illustrated environment 100 in some implementations.

The illustrated environment of FIG. 1 also includes one or more clients 160. Each client 160 may be any computing device operable to connect to or communicate with the development server 102, either directly or via the network 154 using a wireline or wireless connection. Each client 160 includes an interface 164, a processor 168, a memory 176, a client application 172, and a graphical user interface (GUI) 180. In general, client 160 comprises an electronic computer device operable to receive, transmit, process, and store any appropriate data associated with the environment 100 of FIG. 1. It will be understood that there may be any number of clients 160 associated with, or external to, environment 100. For example, while illustrated environment 100 includes two clients 160, alternative implementations of environment 100 may include a single client or multiple clients communicably coupled to development server 102, or any other number of clients suitable to the purposes of the environment 100. Additionally, there may also be one or more additional clients 160 external to the illustrated portion of environment 100 that are capable of interacting with the environment 100 via the network 154. Further, the term "client" and "user" may be used interchangeably as appropriate without departing from the scope of this disclosure. Moreover, while each client 160 is described in terms of being used by a single user, this disclosure contemplates that many users may use one computer, or that one user may use multiple computers.

The GUI 180 associated with client 160 comprises a graphical user interface operable to, for example, allow the user of client 160 to interface with at least a portion of the platform for any suitable purpose, such as creating, preparing, requesting, modifying, or analyzing data, as well as viewing and accessing documents and files associated with various business transactions. Generally, the GUI 180 provides the particular user with an efficient and user-friendly presentation of business data provided by or communicated within the system. The GUI 180 may comprise a plurality of customizable frames or views having interactive fields, pull-down lists, and buttons operated by the user. For example, GUI 180 may provide interactive elements that allow a user to enter or select elements of business process instances and business objects associated with business applications 114 in GUI 180. Portions of the business application 114 associated with the development server 102 may be presented and accessible to the user through GUI 180, such as through a web browser or client application 172, for example. More generally, GUI 180 may also provide general interactive elements that allow a user to access and utilize various services and functions of client application 172. The GUI 180 is often configurable, supports a combination of tables and graphs (bar, line, pie, status dials, etc.), and is able to build real-time portals, where tabs are delineated by key characteristics (e.g. site or microsite). Therefore, the GUI 180 contemplates any suitable graphical user interface, such as a combination of a generic web browser, intelligent engine, and command line interface (CLI) that processes information in the platform and efficiently presents the results to the user visually. In some instances, the client application 172 may be a remote module, agent, or portion of the business application 114 allowing users to access and modify data and values within the development server 102. In some instances, the client application 172 may be a web-based application, or even a web browser, that can perform tasks other than those associated with the development server 102. In some instances, the client application 172 may be used by a remote administrator to initialize or interact with the verification framework 118, such as to remotely initiate a testing or verification procedure on a particular business object associated with the development server 102, as well as to define a time interval for performing verification procedures on one or more business objects.

As used in this disclosure, client 160 is intended to encompass a personal computer, touch screen terminal, workstation, network computer, kiosk, wireless data port, smart phone, personal data assistant (PDA), one or more processors within these or other devices, or any other suitable processing device. For example, each client 160 may comprise a computer that includes an input device, such as a keypad, touch screen, mouse, or other device that can accept user information, and an output device that conveys information associated with the operation of the development server 102 (and business application 114) or the client 160 itself, including digital data, visual information, the client application 172, or the GUI 180. Both the input and output device may include fixed or removable storage media such as a magnetic storage media, CD-ROM, or other suitable media to both receive input from and provide output to users of client 160 through the display, namely, the GUI 180.

While FIG. 1 is described as containing or being associated with a plurality of elements, not all elements illustrated within environment 100 of FIG. 1 may be utilized in each alternative implementation of the present disclosure. For example, although FIG. 1 depicts a development server 102 external to network 154, the development server 102, or a portion of the structure, systems, and functionality associated therewith, may be included within network 154 as part of a cloud computing network solution, for example. In some additional instances, the development server 102 may be a set of servers or other systems that combine to perform the operations associated with the development server 102 and the verification framework 118. Additionally, the verification framework 118 may be offered as a cloud-based solution, or distributed across one or more systems, including clients 160. Still further, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes, in addition to those purposes described herein.

Figure 3:
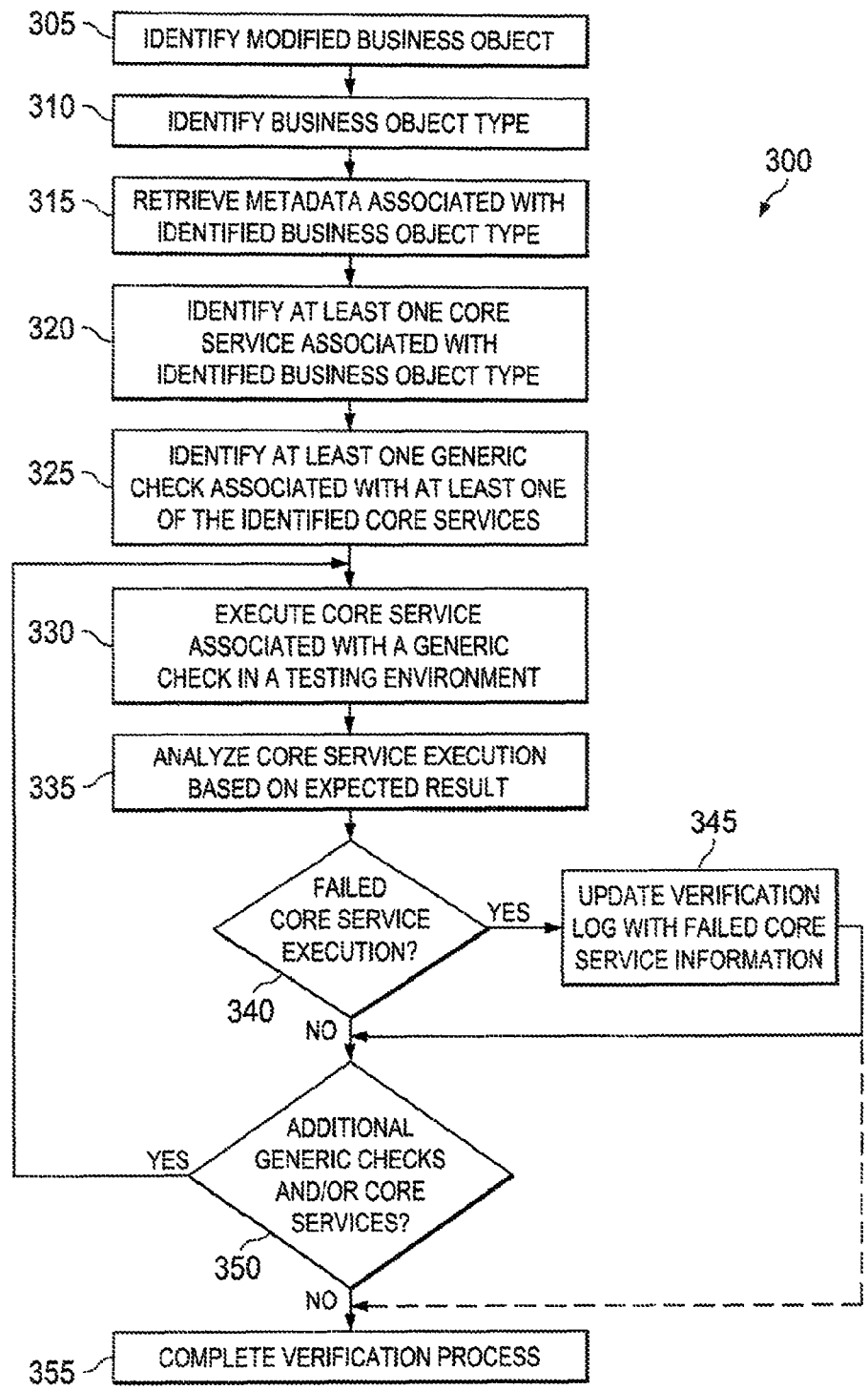
FIG. 3 is a flowchart of an example method for automatically testing and verifying a modified business object.

FIG. 3 is a flowchart of example method 300 for automatically testing and verifying a modified business object. For clarity of presentation, the description that follows generally describes method 300 in the context of environment 100 illustrated in FIG. 1. However, it will be understood that method 300 may be performed, for example, by any other suitable system, environment, or combination of systems and environments, as appropriate.

At 305, a modified business object is identified. In some instances, a modified business object may include a previously existing business object that was changed by a developer or other user, as well as a newly created business object. The business object can be associated with a particular business application or development environment. Identifying the modified business object may be performed in any suitable manner. In some instances, the modified business object may be automatically identified immediately after its modification or creation. The automatic identification may be performed by an agent, application, or other module associated with a metadata repository storing one or more business objects and operable to identify new and/or changed business objects. Additionally, identifying a modified business object may be performed in response to an explicit identification of the business object provided by a user, client, or administrator associated with a development server or system, as well as a program or user external to the development server or system. In still other instances, the modified business object may be identified during a time- or event-based routine or process for performing business object verification activities, such as a daily, hourly, or other interval-based business application health check, for example. In those instances, the entire set of business objects or a subset thereof may be processed and tested using some or all of the operations described herein on a regular or semi-regular basis to test and verify the generic portions of the set of business objects. These routines may identify business objects that have been modified or created since the last execution of the testing and verification procedure, or they may perform the testing and verification on each business object included within a particular repository, or associated with a particular business application or development environment.

At 310, a business object type of the identified business object is identified. In some instances, each business object may be defined based, at least in part, on a template or base business object type, with additional customizations made to the based business object type during creation or modification. The business object type of a particular business object may be included as part of the definition of the business object, or may be derivable based on the particular business object's association with a business object model (or meta-model) defining the underlying business object type of the business object. Once the business object type is identified, at 315 a set of metadata defining and/or associated with the identified business object type is retrieved. The set of metadata can be retrieved by accessing a business object meta-model providing metadata that uniquely defines a particular business object type, and upon which the identified business object is based. In some instances, a metadata repository associated with the development environment or server may be available from which the information can be retrieved. Alternatively, the metadata may be stored in or associated with a remotely located system or metadata repository, accessible via a network connection or web service call.

Once the metadata defining the business object type is identified, at least one core service associated with the identified business object type of the business object is identified at 320. The core services of a business object (and its corresponding business object type) define one or more operations of the business object used to perform business-specific functionality, and may be reused in one or more different business objects and business object types. A business object may combine a plurality of core services to perform a set of higher level functionality performed by a business object. Because of the generic and low-level nature of the core services and their use across multiple business objects and business object types, generic tests can be associated with specific core services and tested within the development environment. Although the steps of 310, 315, and 320 are based on determining a particular business object type for the identified business object, in alternative implementations, method 300 may determine the core services included with a particular business object by directly accessing the set of core services included in the business object (e.g., core services 235 illustrated in the example business object 138 of FIG. 2). The determination of how the core services are identified may be a business object-specific determination, such that method 300 starts by initially determining if the business object includes the set of core service information within its structure and/or whether the set of core services are directly readable and/or accessible from the business object itself.

At 325, after at least one core service associated with the identified business object (or business object type) is identified, at least one generic check associated with at least one of the identified core services is identified. In some instances, identifying a particular generic check associated with a particular core service may be performed by cross-referencing or querying a verification, or check, registry. The verification registry can store a set of testing and verification procedures associated with specific core services, such that each business object containing a particular core service can be tested using those procedures. The verification registry can be a database or other file storing the name or identify of a particular core service associated with one or more testing and verification procedures (including specific code or computer-readable instructions) that may be executed for testing purposes, with some or all of the testing and verification procedures further associated with one or more expected results or result parameters necessary for success. Some core services may not be associated with a generic check in the verification registry, while in other instances, some core services may be associated with a plurality of testing and verification procedures. As described, each testing and verification procedure can include an expected result (or expected result parameters) for the core services' execution, with the expected results defining the parameters or output of the core service that determine whether the business object was successfully verified.

At 330, a first core service of the identified business object is executed using a first generic check identified from the verification registry. In some instances, this execution can be performed within a dedicated runtime environment, using, for example, the testing engine 126 illustrated in FIG. 1. Any suitable runtime environment or engine can be used, particularly within a testing and/or development system. The execution of the first core service can include execution of one or more aspects or a portion of the functionality performed by the core service, or the execution could include the execution of the entire core service. In some instances, a particular generic check can represent the execution of a subpart or portion of the functionality available or associated with the first core service. At 335, the execution of the first core service is analyzed based on the expected results or result parameters associated with the testing and verification procedure. In some instances, the verification framework and/or testing engine can include functionality operable to automatically compare the actual results to the expected results and determine the success or failure of the core service's execution.

At 340, a determination is made as to whether the core service's execution failed the testing and verification procedure. If the testing was successful, method 300 continues at 350. If, however, the core service's execution failed to meet the criteria of the expected results, method 300 continues at 345. At 345, a verification or testing log can be updated with the information on the failed core service, including the actual results or result parameters generated during the core service's execution. In some instances, information on successfully verified core services may also be included with and stored in the verification log. The verification log can be used to store information on the successes and failures of various business objects and their core services, and can allow users, developers, and administrators to access the information to update, modify, or correct any issues that may have occurred during testing. Still further, a message, pop-up box, or other indicator may be provided to a user or administrator associated with the testing environment and/or the business object at 345 when a failed core service is identified, allowing for immediate or quick remedy of the issues identified. As illustrated in FIG. 3, method 300 may continue at 350 or 355 after completion of 345. In some instances, method 300 may continue after a core service fails its verification, continuing until all generic checks for a particular core service are checked, as well as all core services are checked. In those instances, method 300 would continue at 350 after the completion of the operations of 345. In other instances, method 300 may end the verification process when a core service fails a generic check, allowing a developer, administrator, or other user to correct the error immediately. In those instances, method 300 continues at 355 after the operations of 345, and completes the verification process.

At 350, a determination is made as to whether additional generic checks are available for the current core service and, if they are, whether additional core services are included in the business object and are to be checked. If so, method 300 returns to 330, where any additional generic checks are performed for the current core service, as well as the generic checks associated with the other core services of the business object, as necessary. If no additional generic checks and/or core services remain for the business object, method 300 continues at 355 to complete the verification process. In some instances, a message or other notification can be provided to a developer, user, or administrator that the verification process is complete, including a set of overall and/or detailed results of the checks, procedures, and results returned.

Figure 4:
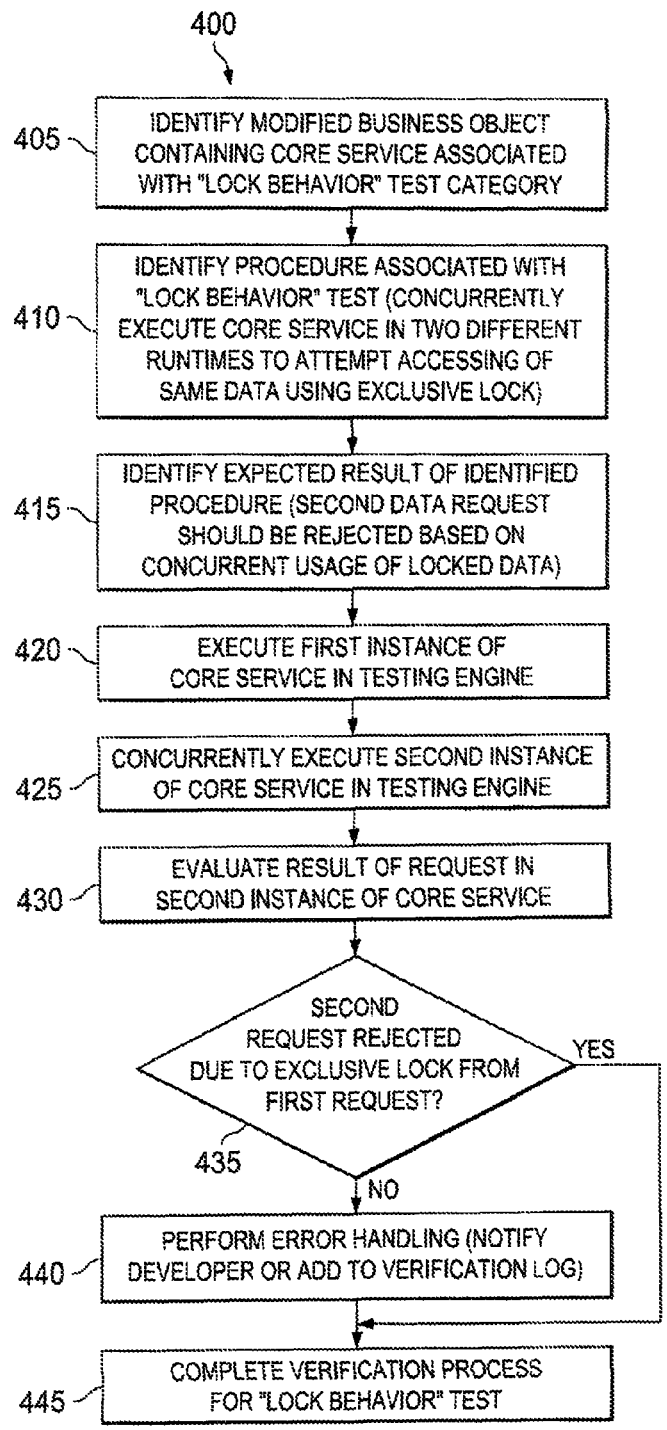
FIG. 4 is a flowchart of an example set of operations performed on an example core service associated with a business object being tested and verified after its modification within a verification framework.

FIG. 4 is a flowchart of an example set of operations 400 performed on an example core service associated with a business object being tested and verified within a verification framework. The example core service illustrated in FIG. 4 is a "Modify" core service, and the illustrated verification procedure is associated with verifying the business object's lock behavior.

At 405, a modified business object is identified, where the business object includes a core service, such as "Modify," which is associated with the "Lock Behavior" test category. For purposes of the present illustration, the identified business object is not necessarily known to be associated with the "Lock Behavior" test category. Instead, a metadata analyzer may determine that the business object is of a specific business object type including the core service of "Modify." Alternatively, the business object may include explicit metadata or information identifying the "Modify" core service, such as in the illustrated business object 138 of FIG. 2.

At 410, a testing and verification procedure associated with the "Lock Behavior" test category is identified. The procedure associated with this test category can be retrieved from the verification registry associated with the "Modify" core service. Similarly, the expected results of the testing and verification procedure can also be identified at 415. In some instances, the expected results can be identified concurrently with the testing and verification procedure, while in other instances, the expected results can be identified after the testing and verification procedure is performed. In the illustrated example, the testing and verification procedure for the "Lock Behavior" test category comprises a single test, the concurrent execution of the core service in two different runtime instances. The concurrent execution of two instances of the core service is meant to test an exclusive lock on the data accessed by the first instance such that an attempt to access the data by the second instance fails or is rejected. The expected result of the testing and verification procedure is therefore that the second instance's request for the data should be rejected or denied based on the exclusive lock performed by the first instance's concurrent accessing of the data.

The operations of 420 and 425 represent the actions defined by the identified testing and verification procedure. At 420, a first instance of the core service is executed in the runtime environment, for example, the testing engine 126 of FIG. 1. At 425, a concurrent execution of a second instance of the core service is executed attempting to access the same data as accessed by the first instance. At 430, the result of the data request from the second instance of the core service is evaluated. The result may be determined based on an error message returned in the runtime environment, the lack of an error message, the output of the execution, or any other suitable measurable or identifiable value or event. For purposes of this example, at 435 a determination is made as to whether the request in the second instance was rejected when attempted due to the exclusive lock from the first instance's accessing of the same data. If the attempt was not rejected, method 400 continues at 440 where the appropriate method of error handling is performed, such as notifying the developer or administrator of the issue, as well as adding the error information into a verification or testing log. If the attempt was rejected (and therefore a successful verification), method 400 continues to 445. At 445, the verification process for the "Lock Behavior" test is completed. In some instances, additional generic tests may be performed and/or additional core services may be tested prior to the completion of the overall verification of the business object.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for automatically testing and verifying business objects, the method comprising the following operations:

automatically identifying a modification to a business object in a development system;

identifying a business object type of the modified business object;

retrieving, in response to the automatic identification of the modification to the business object and without further user interaction, a set of metadata associated with the identified business object type, the set of metadata retrieved from a metadata repository and including at least one core service performed by business objects of the identified business object type of the modified business object;

identifying at least one verification procedure associated with the at least one core service, the at least one verification procedure identified based on a predefined verification registry storing a plurality of verification procedures, each verification procedure associated with at least one specific core service;

executing the at least one identified verification procedure associated with the at least one core service performed by business objects of the identified business object type of the modified business object; and determining whether execution of the at least one identified verification procedure failed.

2. The method of claim 1, wherein the modified business object comprises a newly created business object or a modified version of a previously existing business object.

3. The method of claim 1, wherein the operations of claim 1 are performed by a verification framework, and the metadata repository is located remotely from the verification framework.

4. The method of claim 1, wherein the set of metadata associated with the identified business object type of the modified business object is stored within the modified business object.

5. The method of claim 1, wherein the at least one core service performed by business objects of the identified business object type is defined within a metamodel associated with the identified modified business object.

6. The method of claim 1, wherein determining whether the execution of the at least one identified verification procedure failed comprises:

for each verification procedure retrieved from the verification registry, retrieving corresponding expected results for the verification procedure from the verification registry; and comparing actual results of the execution of the at least one identified verification procedure with the corresponding expected results for the verification procedure; and determining whether the actual results for the execution of the at least one identified verification procedure is different from the corresponding expected results of the verification procedure.

7. The method of claim 6, further comprising notifying at least one software developer of the actual results of the at least one identified verification procedure and their difference from the corresponding expected results of the verification procedure if the actual results of the verification procedure differ from the corresponding expected results of the verification procedure.

8. The method of claim 1, wherein the operations of claim 1 are performed immediately upon the creation or the modification of the business object.

9. A computer program product comprising a non-transitory, tangible storage medium, the computer program product comprising computer readable instructions for causing one or more processors to perform operations comprising:

automatically identifying a modification to a business object in a development system;

identifying a business object type of the modified business object;

retrieving, in response to the automatic identification of the modification to the business object and without further user interaction, a set of metadata associated with the identified business object type, the set of metadata retrieved from a metadata repository and including at least one core service performed by business objects of the identified business object type of the modified business object;

identifying at least one verification procedure associated with the at least one core service, the at least one verification procedure identified based on a predefined verification registry storing a plurality of verification procedures, each verification procedure associated with at least one specific core service;

executing the at least one identified verification procedure associated with the at least one core service performed by business objects of the identified business object type of the modified business object; and determining whether execution of the at least one identified verification procedure failed.

10. The computer program product of claim 9, wherein the modified business object comprises a newly created business object or a modified version of a previously existing business object.

11. The computer program product of claim 9, wherein determining whether the execution of the at least one identified verification procedure failed comprises:

for each verification procedure retrieved from the verification registry, retrieving corresponding expected results for the verification procedure from the verification registry; and comparing actual results of the execution of the at least one identified verification procedure with the corresponding expected results for the verification procedure; and determining whether the actual results for the execution of the at least one identified verification procedure is different from the corresponding expected results of verification procedure.

12. The computer program product of claim 11, the operations further comprising notifying at least one software developer of the actual results of the at least one identified verification procedure and their difference from the corresponding expected results of the verification procedure if the actual results of the verification procedure differ from the corresponding expected results of the verification procedure.

13. The computer program product of claim 9, wherein the set of metadata associated with the identified business object type of the modified business object is stored within the modified business object.

14. The computer program product of claim 9, wherein the operations performed by the one or more processors are performed immediately upon the creation or the modification of the business object.

15. A system comprising:
memory configured to:
store a predefined verification registry, the predefined verification registry storing a plurality of verification procedures, each of the plurality of verification procedures associated with at least one core service and further associated with an expected result for execution of the respective verification procedure; and store a metadata repository, the metadata repository storing a plurality of business objects, each business object associated with at least one core service; and one or more processors configured to perform operations comprising:

automatically identifying a modification to a business object in a development system;

identifying a business object type of the modified business object;

retrieving, in response to the automatic identification of the modification to the business object and without further user interaction, a set of metadata associated with the identified business object type from the metadata repository, the set of metadata including at least one core service performed by business objects of the identified business object type of the modified business object;

identifying at least one verification procedure associated with the at least one core service, the at least one verification procedure identified based on the predefined verification registry, and, for each identified verification procedure, identifying the corresponding expected results for the execution of the verification procedure;

executing the at least one identified verification procedure associated with the at least one core service performed by business objects of the identified business object type of the modified business object; and analyzing the success of the at least one executed verification procedure, wherein analyzing the success of the at least one executed verification procedure includes:

comparing actual results of the execution of the at least one identified verification procedure with the corresponding expected results for the verification procedure; and determining whether the actual results for the execution of the at least one identified verification procedure is different from the corresponding expected results of the verification procedure.

16. The system of claim 15, wherein the operations performed by the one or more processors are performed immediately upon the creation or the modification of the business object.

* * * * *